United States Patent [19]

Fouillot et al.

[11] Patent Number: 5,074,749

[45] Date of Patent: Dec. 24, 1991

[54] TURBINE STATOR FOR A TURBOJET, AND METHOD OF MANUFACTURE

[75] Inventors: Jacques G. Fouillot, Domaine de Valpre; Gérard Letanter, Les Quatre Vents, both of France

[73] Assignee: Societe Europeenne De Propulsion, Suresnes, France

[21] Appl. No.: 526,179

[22] Filed: May 21, 1990

[30] Foreign Application Priority Data

May 23, 1989 [FR] France ................................ 89 06748

[51] Int. Cl.⁵ ............................................... F01D 9/04
[52] U.S. Cl. ................................ 415/190; 415/209.3; 415/209.2; 415/134; 416/190; 29/889.22
[58] Field of Search ...................... 415/189, 190, 209.2, 415/209.3, 209.4, 210.1, 134; 416/189 R, 195, 214 A, 241 B, 191, 190; 29/889, 889.21, 889.22

[56] References Cited

U.S. PATENT DOCUMENTS

| | | | |
|---|---|---|---|
| 2,221,684 | 11/1940 | Smith | 416/191 |
| 3,042,366 | 7/1962 | Holmquist . | |
| 3,357,082 | 12/1967 | Beaney . | |
| 3,367,630 | 2/1968 | Saunders | 416/195 |
| 3,677,663 | 7/1972 | Cronstedt . | |
| 3,900,626 | 8/1975 | Brennan | 156/166 |
| 3,905,723 | 9/1975 | Torti, Jr. | 416/241 B X |
| 4,066,384 | 1/1978 | DiFerinando | 416/189 |
| 4,643,636 | 2/1987 | Libertini et al. . | |

FOREIGN PATENT DOCUMENTS

| | | |
|---|---|---|
| 0172082 | 2/1986 | European Pat. Off. . |
| 2635830 | 2/1978 | Fed. Rep. of Germany ...... 416/189 |
| 389268 | 9/1908 | France . |
| 896203 | 2/1945 | France . |
| 11201 | 2/1978 | Japan ................................ 416/189 |
| 828248 | 2/1960 | United Kingdom . |
| 1096257 | 4/1962 | United Kingdom . |

Primary Examiner—Edward K. Look
Assistant Examiner—James A. Larson
Attorney, Agent, or Firm—Weingarten, Schurgin, Gagnebin & Hayes

[57] ABSTRACT

The stator is made of ceramic matrix composite material and comprises: a bladed hub carrying blades with a radially projecting finger at the end of each blade; and two toothed rings having teeth facing one another with the rings being urged towards each other in order to hold each tenon of a blade both axially and circumferentially between a flank of one of the teeth of one of the rings and a flank of one of the teeth of the other ring. The rings are urged towards each other by resilient coupler which enables them to move apart from each other with the two rings also rotating relative to each other under the effect of the blade tenons expanding, with the stator being fixed to the casing of the turbojet by mechanical connections between the casing and one of the rings.

6 Claims, 4 Drawing Sheets

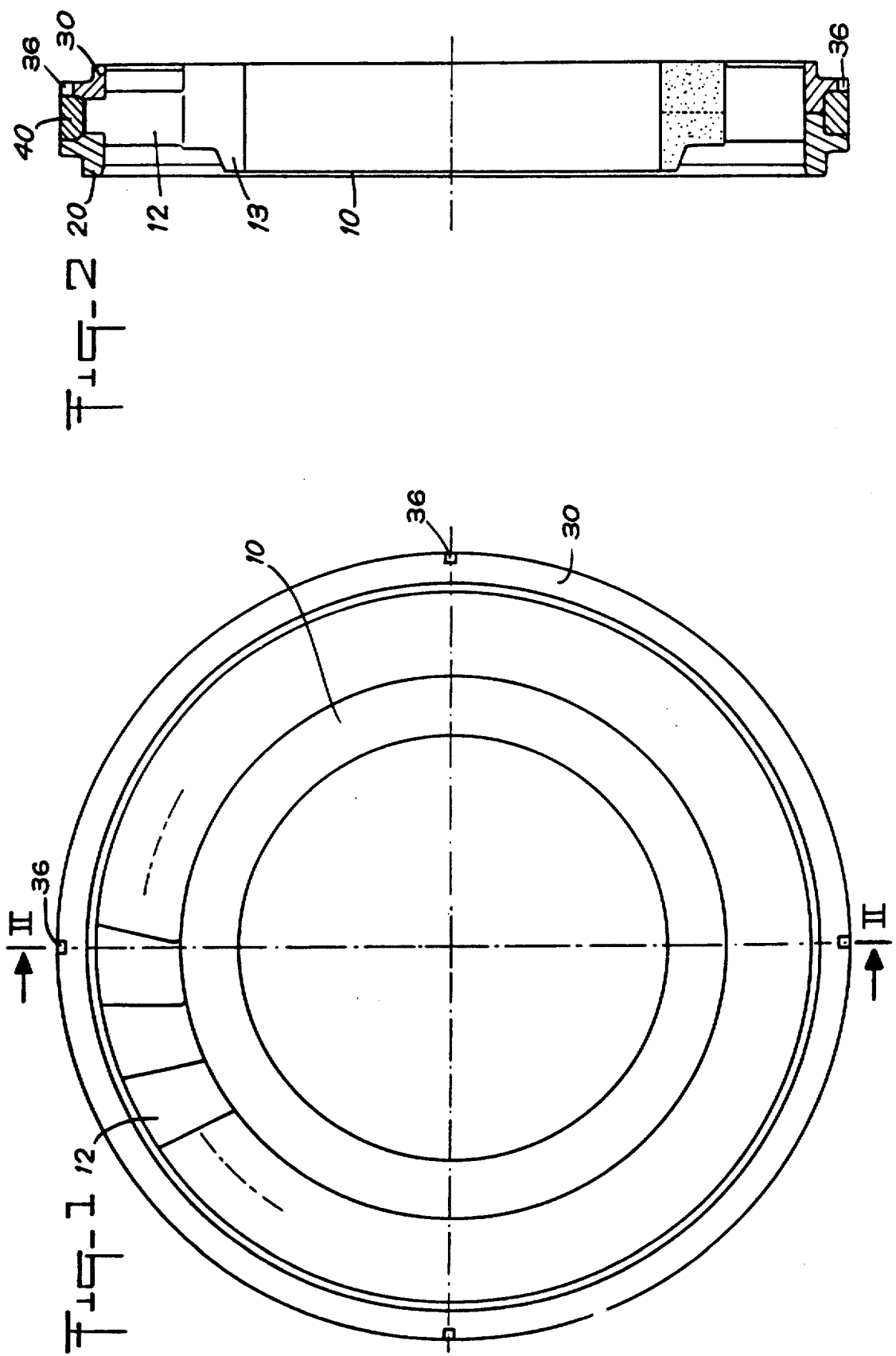

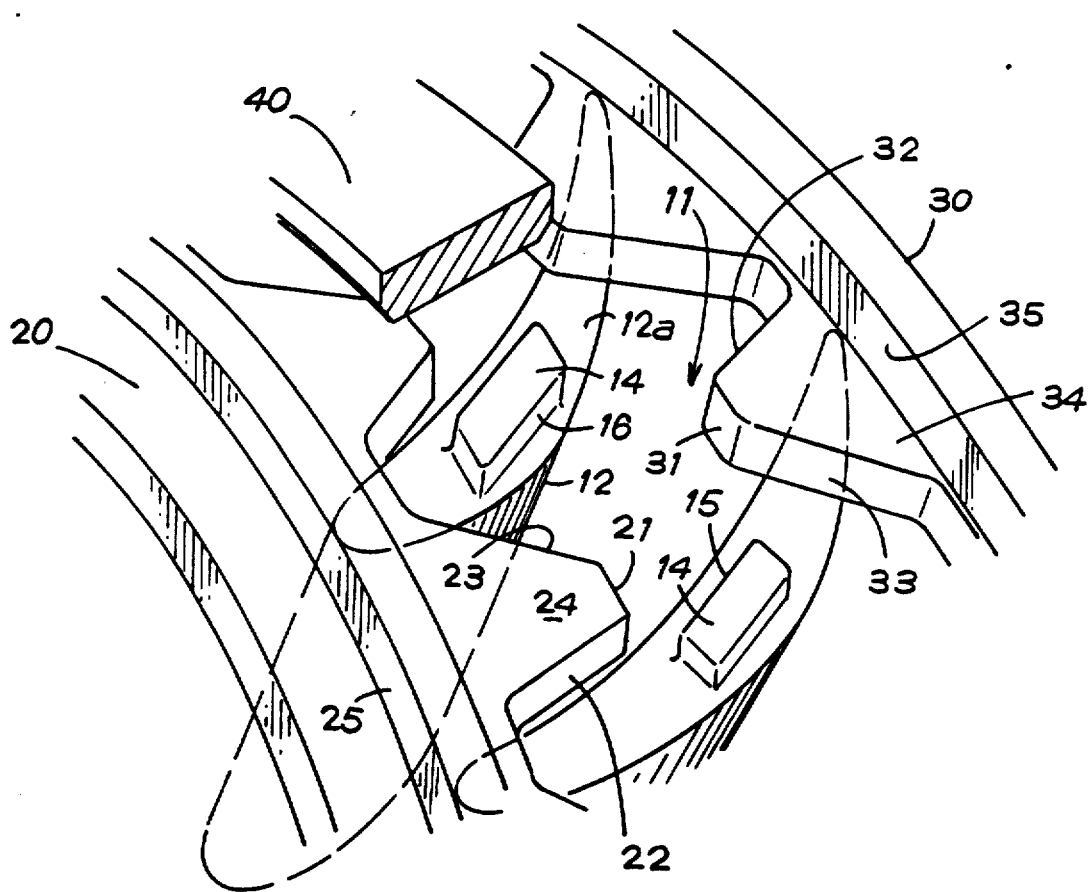

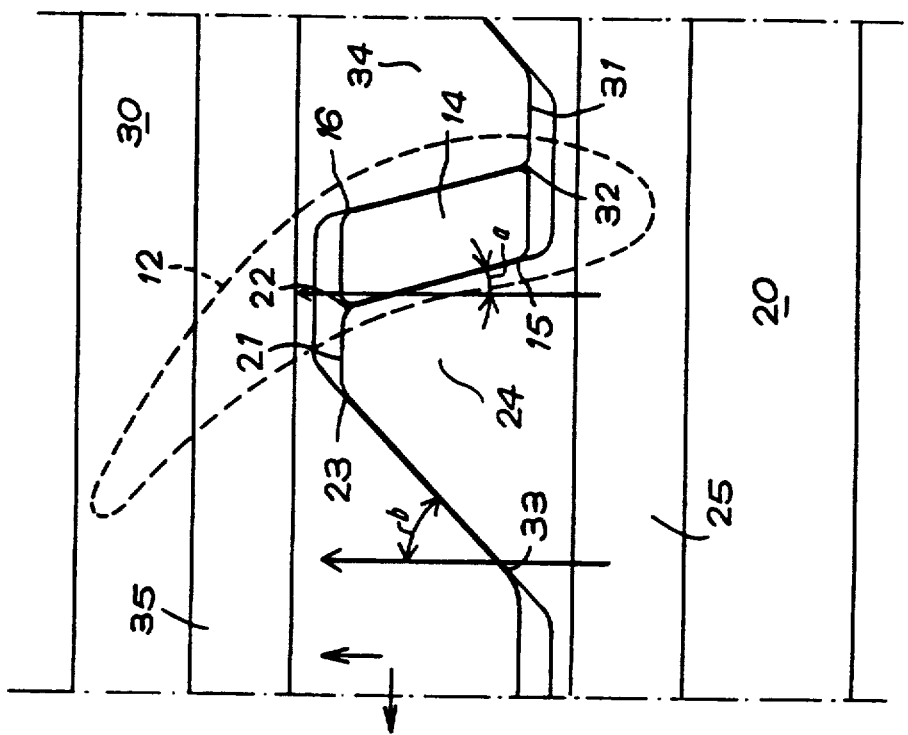
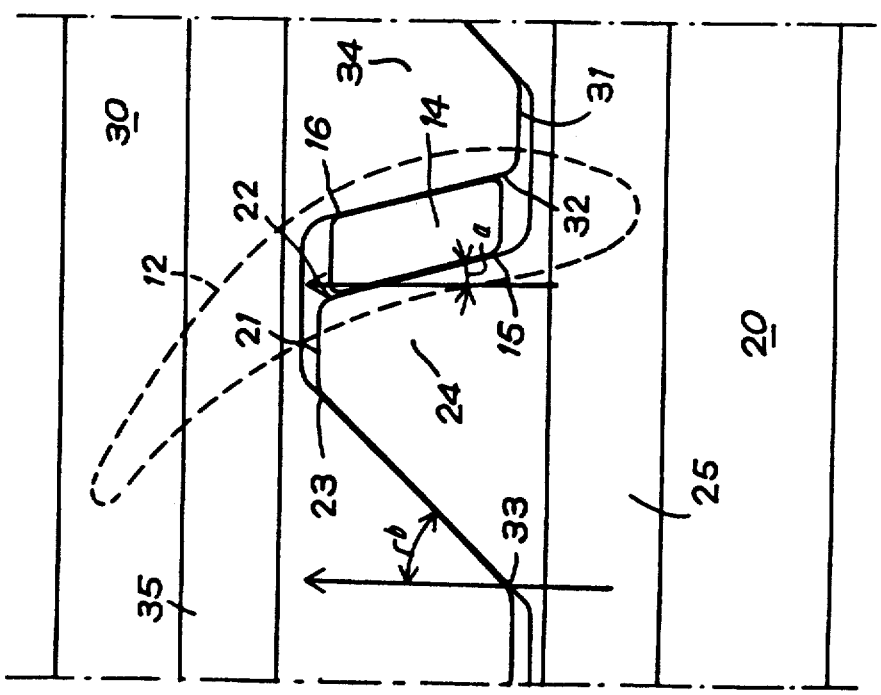

TURBINE STATOR FOR A TURBOJET, AND METHOD OF MANUFACTURE

The present invention relates to a turbine stator for a turbojet.

BACKGROUND OF THE INVENTION

In a turbojet, the first stator placed immediately at the outlet from the combustion chamber comprises a set of fixed blades defining juxtaposed channels or passages which channel the flow of gas between the combustion chamber and the turbine rotor.

The disposition of a turbojet is such that the energy imparted to the turbine rotor is transmitted to the compressor which is upstream from the combustion chamber by means of a central shaft passing through the turbine stator. The stator must therefore be fixed to the casing of the turbojet via its periphery.

Known turbine stators are made of metal or of sintered ceramics, and this limits their performance.

The use of refractory composite materials, in particular ceramic matrix composite (CMC) materials, should enable performance to be improved because these materials are capable of withstanding very high temperatures while retaining mechanical strength.

However, although metal or sintered ceramic turbine stators may be made by molding, this is not true of stators made of a CMC.

Thus, the object of the present invention is to provide a method of manufacture which is particularly adapted to making a turbine stator out of CMC.

SUMMARY OF THE INVENTION

The object is achieved by means of a method comprising the following steps:

making a bladed hub carrying blades around its periphery, each blade having a finger or tenon projecting radially from its outer end;

making two toothed rings having axially directed teeth, the teeth of the two rings extending around circumferences of the same diameter which is slightly greater than the diameter of the bladed hub, not including the tenons;

bringing together the two toothed rings with their teeth facing each other on either side of the bladed hub so as to hold each blade tenon both axially and circumferentially between a flank of a tooth of one of the rings, and a flank of a tooth of the other ring; and keeping the toothed rings applied against each other in the axial direction.

Each of the teeth locking a tenon is made with a first flank bearing against a corresponding surface of the tenon and with a second flank bearing against a corresponding second flank of a tooth of the other ring.

The second flanks of the teeth form ramps which are inclined relative to the axial direction. Thus, in the event of an increase in temperature causing the bladed hub to expand by more than the toothed rings, the expansion of the tenons which tends to push apart the teeth between which they are received is converted, by the ramps formed by the second flanks of the teeth, into relative rotation between the rings, and possibly also into the rings moving axially apart from each other. The rings are thus advantageously pressed against each other in the axial direction by resilient means which, when necessary, enable them to move apart axially while continuously urging them towards each other. The stator is fixed to the turbojet casing by means of a mechanical connection between the casing and one of the two rings, thereby enabling the rings to rotate relative to each other under the effect of the blade tenons expanding.

The toothed rings do not exert any locking force on the tenons in the radial direction, thereby leaving expansion in this direction free. The gap between the toothed rings may be closed radially by an annular part that leaves clearance relative to the ends of the tenons.

The invention also provides a CMC turbine stator for a turbojet of the type obtained by the method defined above.

BRIEF DESCRIPTION OF THE DRAWINGS

An embodiment of the invention is described by way of example with reference to the accompanying drawings, in which:

FIG. 1 is a diagrammatic end view of a CMC turbine stator made in accordance with the invention;

FIG. 2 is a section view on diametral plane II—II of FIG. 1;

FIG. 3 is an exploded fragmentary perspective view showing how the FIG. 1 stator is assembled;

FIG. 4 is a fragmentary view developed in a plane showing how a blade tenon is held between two teeth of the toothed rings of the FIG. 1 stator;

FIG. 5 is a view analogous to that of FIG. 4, showing the relative motion between the toothed rings due to expansion of the tenon.

DETAILED DESCRIPTION

Figure 6:
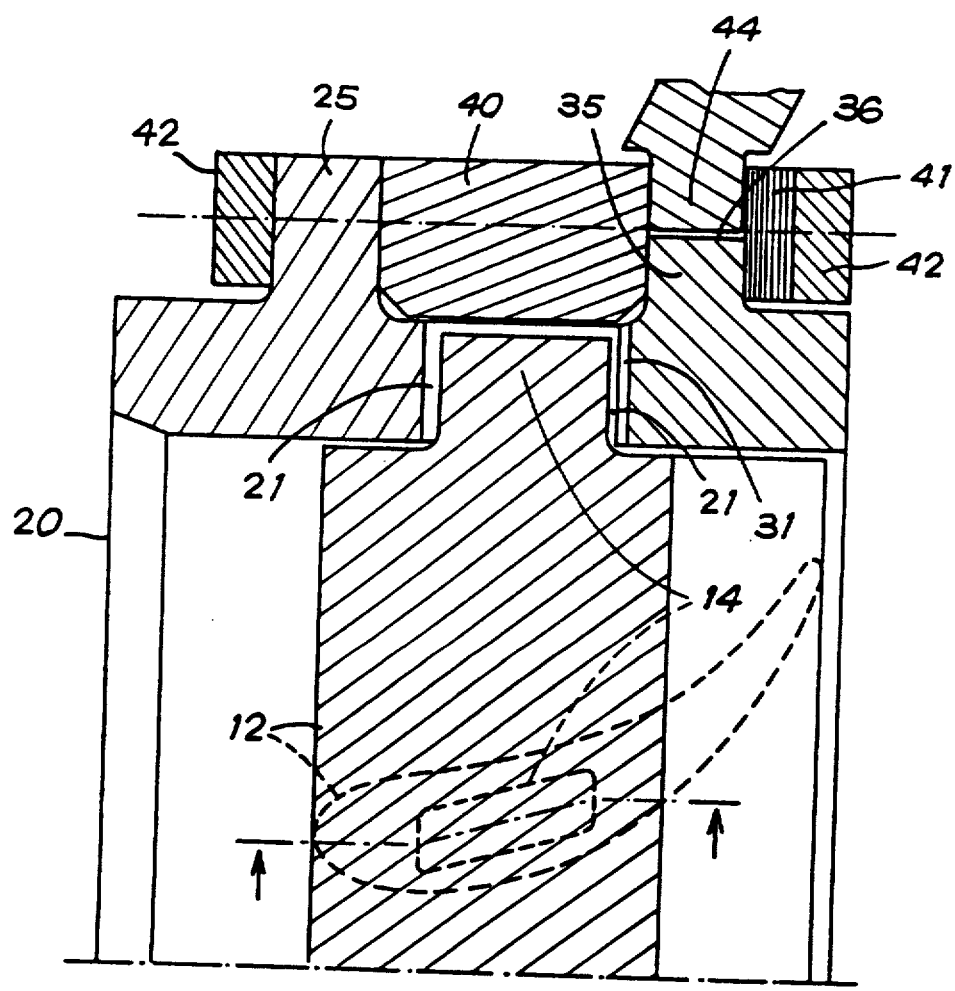
FIG. 6 is a fragmentary axial section view through the stator of FIG. 1 showing how the stator is mounted in the casing of a turbojet.

As shown in particular in FIGS. 1 to 3, a CMC turbine stator for a turbojet made in accordance with the invention comprises an assembly of a bladed hub 10, two toothed rings 20 and 30, and an annular part 40 interposed between the rings.

The bladed hub 10 is made as a single piece of CMC and includes a plurality of blades 12 regularly distributed around a central portion 13 constituting a hub. The blades 12 define passages or channels 11 between one another for the purpose of channeling the flow of gases from the combustion chamber towards the turbine rotor of the turbojet. A tenon or finger 14 projects radially from the outer end surface 12a of each blade, projecting from the central portion of said surface.

Each of the toothed rings 20 and 30 is made as a single piece of CMC. The rings 20 and 30 have respective teeth 21 and 31 extending axially and facing each other. The rings 20 and 30 are toothed in analogous manner and are disposed at the same diameter which is slightly greater than the outside diameter of the bladed hub 10, not including its tenons. As a result, the rings 20 and 30 may be moved towards each other from opposite sides of the bladed hub, passing outside the end surfaces 12a of the blades 12 while leaving radial clearance relative thereto. The number and disposition of the teeth 21 and 31 are chosen so that, whenever the two rings 20 and 30 are urged towards each other, each blade tenon 14 is held axially and circumferentially between a flank 22 of one of the teeth 21 and a flank 32 of one of the teeth 31. In the example shown, the teeth 21 and 31 are regularly distributed around the rings 20 and 30, and the number of teeth on each ring is the same as the number of blades. In addition, the thickness of the teeth 21 and 31 and the height of the tenons 14 are selected so that the tenons do not project radially beyond the cylindrical outer surfaces 24 and 34 of the teeth of the rings 20 and 30.

The annular part 40 is made of a single piece of CMC. It is disposed between the rings 20 and 30 and outside the teeth 21 and 31, in order to close the gap between the rings 20 and 30 radially. The inside diameter of the annular part 40 is such as to leave radial clearance at least with the ends of the tenons 14, and possibly also with the surfaces 24 and 34. In the axial direction, the annular part 40 is received between two outwardly directed annular rims 25 and 35 on the rings 20 and 30.

The CMC from which the parts 10, 20, 30, and 40 is made is a material including fiber reinforcement constituted by refractory fibers, e.g. carbon fibers or fibers of a ceramic such as alumina or silicon carbide, and a ceramic matrix, e.g. likewise alumina or silicon carbide.

Each of the parts 10, 20, 30, and 40 may be obtained by initially forming a cylindrical preform, e.g. by winding a cloth made of the reinforcing fibers (e.g. a woven cloth) and then densifying it by infiltrating ceramic material for constituting the matrix. Densification may be performed by chemical vapor infiltration, possibly after depositing an interphase material between the reinforcing fibers and the matrix. Manufacturing methods using CMC are well known and a more detailed description is therefore not required.

Reference may be made, in particular, to European patent number 0 172 082. After densification, each part is machined to its final shape, in particular to shape the blades of the bladed hub 10 and the teeth of the rings 20 and 30.

As shown more particularly in FIGS. 4 and 5, each tenon 14 has two opposite faces 15 and 16 which bear against the flanks 22 and 32 of the two teeth 21 and 31 between which the tenon is held. The sets of teeth of the rings 20 and 30 are in mutual contact via the other flanks 23 and 33 of the teeth 21 and 31.

The flanks 22 and 32 between which the tenons 14 are held are inclined at a non-zero angle a relative to the axial direction, such that each tenon is held both axially and circumferentially. It is desirable for the tenons 14 to bear against the flanks 22 and 32 over as large an area as possible. In practice, the tenons 14 may be made with their largest faces oriented in substantially the same direction as the faces of the blades 12, as can be seen in FIG. 4 where a blade 12 is shown in dashed lines. The value of the angle a is thus determined in practice by the disposition of the blades 12. This value is preferably less than 30°, and may be about 15°, for example.

When differential expansion takes place between the tenons 14 and the teeth 21 and 31 while the stator is in use due to the blades 12 being heated to a higher temperature than the rings 20 and 30, the greater expansion of each tenon 14 causes it to urge apart the teeth 21 and 31 between which it is held. The mutually contacting flanks 23 and 33 of the teeth form ramps inclined at an angle b relative to the axial direction such that expansion of the tenons gives rise to relative rotation of the rings 20 and 30 which also move apart from each other as shown in exaggerated manner in FIG. 5. The angle of inclination b of the flanks 23 and 33 is selected to facilitate such relative sliding. It preferably lies between 30° and 60°, e.g. being equal to 45°.

In the radial direction, the clearance between the tenons 14 and the annular part 40 allows the tenons to expand freely.

The stator must be mounted in the turbojet casing in such a manner as to hold the stator fixed relative to the casing while allowing small amplitude relative motion to take place both in rotation and in the axial direction between the rings 20 and 30.

To this end, and as shown in FIG. 6, the rings 20 and 30 are urged towards each other by clamping means 42 clamping together the rings 20 and 30 via an interposed washer 41 which is resiliently deformable at least in a radial direction while simultaneously withstanding small amplitude shear. The washer 41 is advantageously constituted by a graphite gasket made up of radially oriented sheets. The rings 20 and 30 are thus permanently resiliently urged towards each other in the axial direction.

The stator is mechanically connected to the casing of the turbojet by means of pegs 44 fixed to the casing and engaging in notches 36 formed at uniform intervals around the periphery of the ring 30 (FIGS. 1, 2, and 6). There may be four such rings 36, for example.

We claim:

1. A turbine stator for a turbojet, wherein the stator is made of ceramic matrix composite material and comprises:

a bladed hub having blades around its periphery, each blade having a finger or tenon projecting radially from its outer end; and two toothed rings having teeth directed axially, the teeth of the two rings facing one another and extending around circumferences of the same diameter, which diameter is slightly greater than the diameter of the bladed hub, not including the tenons, the toothed rings being pressed towards each other in the axial direction in such a manner that each tenon is held axially and circumferentially between a flank of one of the teeth of one of the rings and a flank of one of the teeth of the other ring;

wherein each tenon-engaging toothed ring has a first flank bearing against a corresponding surface of the tenon, and a second flank bearing against a corresponding second flank of a tooth of the other toothed ring; and wherein the second flanks of the teeth form ramps inclined relative to the axial direction; and wherein the toothed rings are kept pressed towards each other by a resilient coupler.

2. A turbine stator for a turbojet, wherein the stator is made of ceramic matrix composite material and comprises:

a bladed hub having blades around its periphery, each blade having a finger or tenon projecting radially from its outer end; and two toothed rings having teeth directed axially, the teeth of the two rings facing one another and extending around circumferences of the same diameter, which diameter is slightly greater than the diameter of the bladed hub, not including the tenons, the toothed rings being pressed towards each other in the axial direction in such a manner that each tenon is held axially and circumferentially between a flank of one of the teeth of one of the rings and a flank of one of the teeth of the other ring;

wherein each tenon-engaging toothed ring has a first flank bearing against a corresponding surface of the tenon, and a second flank bearing against a corresponding second flank of a tooth of the other toothed ring; and further including an annular part disposed between the toothed rings outside the teeth, with clearance being left between said annular part and the ends of the tenons.

3. A turbine stator for a turbojet, wherein the stator is made of ceramic matrix composite material and comprises:

a bladed hub having blades around its periphery, each blade having a finger or tenon projecting radially from its outer end; and two toothed rings having teeth directed axially, the teeth of the two rings facing one another and extending around circumferences of the same diameter, which diameter is slightly greater than the diameter of the bladed hub, not including the tenons, the toothed rings being pressed towards each other in the axial direction in such a manner that each tenon is held axially and circumferentially between a flank of one of the teeth of one of the rings and a flank of one of the teeth of the other ring;

wherein each tenon-engaging toothed ring has a first flank bearing against a corresponding surface of the tenon, and a second flank bearing against a corresponding second flank of a tooth of the other toothed ring; and wherein attachment points are provided on one of the two toothed rings for providing a mechanical connection with a turbojet casing.

4. A method of manufacturing a turbine stator made of ceramic matrix composite material, the method comprising the following steps:

making a bladed hub carrying blades around its periphery, each blade having a finger or tenon projecting radially from its outer end;

making two toothed rings having axially directed teeth, the teeth of the two rings extending around circumferences of the same diameter, which diameter is slightly greater than the diameter of the bladed hub, not including the tenons;

bringing together the two toothed rings with their teeth facing each other on either side of the bladed hub so as to hold each blade tenon both axially and circumferentially between a flank of a tooth of one of the rings, and a flank of a tooth of the other ring, and keeping the toothed rings applied against each other in the axial direction;

wherein the toothed rings are made and applied against each other in such a manner that each tenon-engaging ring tooth has a first flank in contact with a surface of a tenon and a second flank in contact with a corresponding second flank of a tooth on the other ring, the second flanks of the teeth forming ramps that are inclined relative to the axial direction; and wherein the rings are kept applied against each other in such a manner as to enable relative axial and rotary motion between the rings.

5. A method of manufacturing a turbine stator made of ceramic matrix composite material, the method comprising the following steps:

making a bladed hub carrying blades around its periphery, each blade having a finger or tenon projecting radially from its outer end;

making two toothed rings having axially directed teeth, the teeth of the two rings extending around circumferences of the same diameter, which diameter is slightly greater than the diameter of the bladed hub, not including the tenons;

bringing together the two toothed rings with their teeth facing each other on either side of the bladed hub so as to hold each blade tenon both axially and circumferentially between a flank of a tooth of one of the rings, and a flank of a tooth of the other ring; and keeping the toothed rings applied against each other in the axial direction;

wherein an annular part is interposed between the toothed rings outside the teeth in order close a gap between the toothed rings radially while leaving clearance relative to the ends of the tenons of the blades.

6. A method of manufacturing a turbine stator made of a ceramic matrix composite material according to claims 4 or 5, wherein each of the parts constituted by the bladed hub and by the toothed rings is made as a single piece of ceramic matrix composite material.

* * * * *

UNITED STATES PATENT AND TRADEMARK OFFICE
CERTIFICATE OF CORRECTION

PATENT NO. : 5,074,749

DATED : December 24, 1991

INVENTOR(S) : Jacques G. Fouillot et al

It is certified that error appears in the above-indentified patent and that said Letters Patent is hereby corrected as shown below:

In the Abstract, line 9, "by resilient" should read --by a resilient--; and in line 13, "of the turbojet" should read --of a turbojet--.

Column 4, line 23, "rings" should read --notches--.

Signed and Sealed this

First Day of November, 1994

Attest:

BRUCE LEHMAN

Attesting Officer

Commissioner of Patents and Trademarks